United States Patent
Barber et al.

(10) Patent No.: US 10,296,619 B2
(45) Date of Patent: *May 21, 2019

(54) MULTIPLICATION-BASED METHOD FOR STITCHING RESULTS OF PREDICATE EVALUATION IN COLUMN STORES

(71) Applicant: International Business Machines Corporation, Armonk, NY (US)

(72) Inventors: Ronald J Barber, San Jose, CA (US); Min-Soo Kim, Daegu (KR); Jae Gil Lee, Daejeon (KR); Sam S Lightstone, Toronto (CA); Guy M Lohman, San Jose, CA (US); Lin Qiao, San Jose, CA (US); Vijayshankar Raman, Sunnyvale, CA (US); Richard S Sidle, Mountain View, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 641 days.

This patent is subject to a terminal disclaimer.

(21) Appl. No.: 14/867,682

(22) Filed: Sep. 28, 2015

(65) Prior Publication Data
US 2016/0019264 A1 Jan. 21, 2016

Related U.S. Application Data

(63) Continuation of application No. 13/614,625, filed on Sep. 13, 2012, now Pat. No. 9,176,999.

(51) Int. Cl.
*G06F 17/30* (2006.01)

(52) U.S. Cl.
CPC .. *G06F 17/30498* (2013.01); *G06F 17/30315* (2013.01); *G06F 17/30324* (2013.01)

(58) Field of Classification Search
CPC ......... G06F 17/30315; G06F 17/30324; G06F 17/30498
See application file for complete search history.

(56) References Cited

U.S. PATENT DOCUMENTS

| 4,852,049 A | * | 7/1989 | Sakai | ................. G06F 9/30018 711/214 |
| 5,542,073 A | | 7/1996 | Schiefer et al. | |

(Continued)

OTHER PUBLICATIONS

Min et al. "Improving In-memory Column Store Database Predicate Evaluation Performance on Multi-core Systems" 22nd Symposium on Computer Architecture and High Performance Computing, (Oct. 2010), pp. 63-70.

(Continued)

*Primary Examiner* — Miranda Le
(74) *Attorney, Agent, or Firm* — Kunzler, PC

(57) ABSTRACT

A system joins predicate evaluated column bitmaps having varying lengths. The system includes a column unifier for querying column values with a predicate generating an indicator bit for each of the column values that is then joined with the respective column value. The system also includes a bitmap generator for creating a column-major linear bitmap from the column values and indicator bits. The column unifier also determines an offset between adjacent indicator bits. The system also includes a converter for multiplying the column-major linear bitmap with a multiplier to shift the indicator bits into consecutive positions in the linear bitmap.

18 Claims, 4 Drawing Sheets

(56) References Cited

U.S. PATENT DOCUMENTS

| | | | |
|---|---|---|---|
| 5,649,181 A * | 7/1997 | French | G06F 17/30324 |
| 5,734,600 A * | 3/1998 | Dieffenderfer | G06F 7/5334 |
| | | | 708/625 |
| 5,848,408 A | 12/1998 | Jakobsson et al. | |
| 5,852,821 A * | 12/1998 | Chen | G06F 17/30324 |
| 6,081,800 A * | 6/2000 | Ozbutun | G06F 17/30324 |
| 6,298,368 B1 * | 10/2001 | Miller, Jr. | G06F 7/5338 |
| | | | 708/550 |
| 6,711,563 B1 | 3/2004 | Koskas | |
| 6,760,742 B1 | 7/2004 | Hoyle | |
| 6,804,664 B1 * | 10/2004 | Hartman | G06F 17/30324 |
| 6,823,329 B2 | 11/2004 | Kirk et al. | |
| 7,000,099 B2 * | 2/2006 | Sazegari | G06F 7/764 |
| | | | 712/300 |
| 7,092,954 B1 * | 8/2006 | Ramesh | G06F 17/30498 |
| | | | 707/714 |
| 7,107,282 B1 | 9/2006 | Yalamanchi | |
| 7,689,630 B1 | 3/2010 | Lam | |
| 7,792,823 B2 | 9/2010 | Cain et al. | |
| 8,150,899 B2 * | 4/2012 | Kim | G06F 7/5332 |
| | | | 708/204 |
| 8,285,709 B2 | 10/2012 | Candea et al. | |
| 8,359,461 B2 * | 1/2013 | Gonion | G06F 8/4441 |
| | | | 712/222 |
| 8,375,165 B2 | 2/2013 | Liu et al. | |
| 8,422,668 B1 | 4/2013 | Thichina | |
| 8,458,685 B2 | 6/2013 | Greyzck | |
| 8,626,745 B2 * | 1/2014 | Okamoto | G06F 17/3046 |
| | | | 707/715 |
| 8,805,850 B2 * | 8/2014 | Sukhwani | G06F 17/30498 |
| | | | 707/698 |
| 8,832,142 B2 * | 9/2014 | Marwah | G06F 17/30477 |
| | | | 707/769 |
| 2004/0225639 A1 | 11/2004 | Jakobsson et al. | |
| 2006/0034368 A1 | 2/2006 | Klivington | |
| 2008/0222136 A1 | 9/2008 | Yates et al. | |
| 2008/0319939 A1 | 12/2008 | Tarin | |
| 2009/0248648 A1 * | 10/2009 | Johnson | G06F 17/30445 |
| 2009/0254516 A1 | 10/2009 | Meiyyappan et al. | |
| 2009/0254532 A1 | 10/2009 | Yang et al. | |
| 2010/0049730 A1 | 2/2010 | Qiao et al. | |
| 2011/0093867 A1 * | 4/2011 | Wyman | G06Q 30/00 |
| | | | 719/318 |
| 2012/0084278 A1 | 4/2012 | Franke et al. | |
| 2013/0275364 A1 | 10/2013 | Wang et al. | |
| 2014/0052743 A1 * | 2/2014 | Schauer | G06F 17/30442 |
| | | | 707/754 |

OTHER PUBLICATIONS

Copeland et al. "A Decomposition Storage Model" Proceedings of the 1985 ACM SIGMOD International Conference of Management of Data, (1985), pp. 268-279.
Zandi et al. "Sort Order Preserving Data Compression for Extended Alphabets", Data Compression Conference, (1993), pp. 330-339.
Antoshenov et al. "Order-Preserving Key Compression", Digital Equipment Corporation, Cambridge Research Laboratory, (Jun. 1994), 28 pages.
Raman et al. "Constant-Time Query Processing", IEEE 24th International Conference on Data Engineering, (Apr. 2008), pp. 60-69.
Johnson et al. "Row-Wise Parallel Predicate Evaluation", Proceedings of the VLDB Endowment, vol. 1, Issue 1, (Aug. 2008), pp. 622-634.
Willhalm et al. "SIMD-Scan: Ultra Fast in-Memory Table Scan using on-Chip Vector Processing Units", Proceedings of the VLDB Endowment, vol. 2, Issue 1, (Aug. 2009), pp. 385-394.

* cited by examiner

MULTIPLICATION-BASED METHOD FOR STITCHING RESULTS OF PREDICATE EVALUATION IN COLUMN STORES

CROSS-REFERENCE TO RELATED APPLICATIONS

This application is a continuation of U.S. patent application Ser. No. 13/614,625, filed on Sep. 13, 2012 and entitled, "A Multiplication-Based Method for Stitching Results of Predicate Evaluation in Column Stores," which is incorporated in its entirety herein.

BACKGROUND

There are generally two methods used in computing for storing multidimensional arrays in linear memory: row-major ordering, and column-major ordering. Identifying the correct layout is important for processing the array because the manner in which a computer program traverses the linear array depends on the method used to generate the array.

In row-major ordering, a multidimensional array is stored so that rows are positioned one after the other. For example, a simple two dimensional array such as $$\begin{matrix} 1 & 2 & 3 \\ 4 & 5 & 6 \end{matrix}$$

is stored linearly as [1 2 3 4 5 6]. Conversely, when stored in column-major ordering, the two dimensional array is stored as [1 4 2 5 3 6].

Column-major layout has emerged as a common scheme for organizing data in data warehouses because this layout results in reduced IO requirements for queries. This is because each query needs to scan only the columns that it references. However, stitching together the results of operations over individual columns is complicated by the column-major layout.

For example, assume that: (1) a column A is encoded using a 10-bit dictionary code and is stored linearly as 25 values in a 256-bit word, with 6 bits of padding; and (2) a column B is encoded with a 9-bit code stored linearly as a 14 values in a 128-bit word with 2 bits of padding. If one were to run a query with conditions (predicates) of A<5 and B=10, one can very efficiently compute the answers of the predicates on columns A and B separately (i.e., separately compute the list of records satisfying A<5, and satisfying B=10).

However, it is very inefficient to combine the results of the query on A and B. Currently methods for combining the results of the queries include either: (1) extracting the results for A and B into separate bitmaps by applying a separate shift and mask for each tuple and then forming a bitwise-AND of the results; or (2) performing Streaming SIMD Extensions (SSE) shuffle instructions to expand both columns to occupy, for example, four entries of a 128-bit word and then doing a bitwise-AND of the resultant words. A further difficulty with either of these methods is that the query results must all be bitmaps that are positionally aligned with each other. Stated differently, the i'th bit of the query result of column A must be for the same record as the i'th bit of the query result for column B.

SUMMARY

Embodiments of a system are described. In one embodiment, the system joins predicate evaluated column bitmaps having varying lengths. The system may include a column unifier for querying column values with a predicate and generating an indicator bit for each of the column values that is then joined with the respective column value. The system also includes a bitmap generator for creating a column-major linear bitmap from the column values and indicator bits. The column unifier also determines an offset between adjacent indicator bits. The system also includes a converter for multiplying the column-major linear bitmap with a multiplier to shift the indicator bits into consecutive positions in the linear bitmap. Other embodiments of the system are also described.

Embodiments of a method are also described. In one embodiment, the method includes querying a plurality of column values with a predicate, generating an indicator bit for each of the plurality of column values based on the predicate and joining each of the plurality of column values with the respective indicator bit, and generating a column-major linear bitmap from the plurality of column values and respective indicator bits. The method may also include determining an offset between adjacent indicator bits, and multiplying the column-major linear bitmap with a multiplier to shift the indicator bits into consecutive positions in the linear bitmap. Other embodiments of the method are also described.

Other aspects and advantages of embodiments of the present invention will become apparent from the following detailed description, taken in conjunction with the accompanying drawings, illustrated by way of example of the principles of the invention.

DETAILED DESCRIPTION

Figure 1:
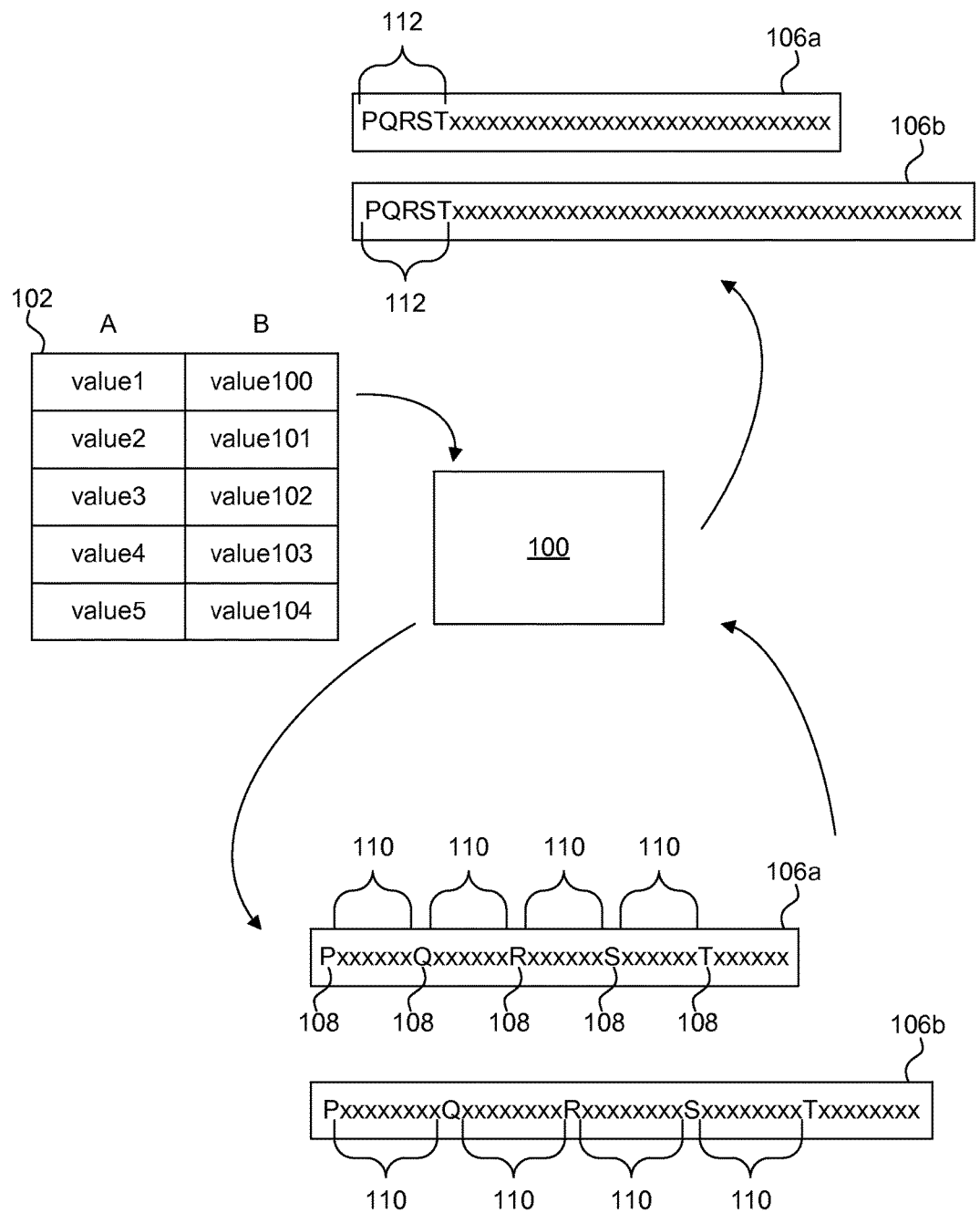
FIG. 1 is a schematic block diagram illustrating one embodiment of predicate evaluation using a column unifier.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments coalesce bits of interest in predicate evaluated bitmaps into consecutive positions so that a bitwise AND of the bitmaps results in a combined bitmap of individually evaluated columns. Coalescing or shifting the bits of interest (or indicator bits) is a result of multiplying the bitmap with a multiplier selected according to the offset between the bits of interest and then performing a bitwise AND on the multiplied bitmap with a mask.

FIG. 1 is a schematic block diagram illustrating one embodiment of predicate evaluation using a column unifier 100. The column unifier 100 is configured to utilize multiplications to combine results from predicate evaluations on individual columns in a column store 102. Arrows in FIG. 1 graphically represent the flow of data from the column store 102 to the column unifier to a bitmap 106a, 106b, and finally to a bitmap with indicator bits 108 in consecutive positions 112.

In a column store 102, or column-oriented database management system, content is stored in a column-major order as compared to row-major order. Although a database management system displays the content of a database as a two-dimensional table, a computing device must store the two-dimensional table as a one-dimensional series of bytes for storage in RAM, a hard disk drive, or both.

In the column store 102, the entries are stored as linear vectors by column. For example, the column A 104 is stored as ColA={value1, value2, value3, value4, value5}. Conversely, in a row-major order system, table entries are stored linearly as Row1={value1, value100}, Row2={value2, value101}, etc. Column-major ordering has advantages for data warehouses where aggregates are computed over large numbers of similar data items.

To evaluate a predicate (condition) in a query, predicates are evaluated on values in each column separately to form a query-result bit-vector or bitmap 106a-b for each column. The column unifier 100 generates the query-result bitmaps 106a, 106b with an indicator bit 108 for each entry in the column. In the depicted embodiment, the indicator bits 108 are represented by the letters P, Q, R, S, and T. Each indicator bit 108 may represent whether a column entry satisfies the predicate or condition of the query. For example, if the predicate is "ColA>5," the column unifier 100 evaluates the entries in column A 104 and generates the bitmap 106a with the indicator bits 108 representing whether each entry satisfies the predicate. In other words, if "value1" of column A 104 is greater than "5," the indicator bit P is set to "1," for example. It is important to note that although arrows indicate one example of how the column unifier may evaluate the columns of the column store, the computation of bitmaps 106a, 106b may be done separately.

Before the column unifier 100 can combine the results of the bitmaps 106a, 106b using a bitwise operation, the bitmaps 106a, 106b must be positionally aligned. Stated differently, the bit of bitmap 106a must correlate to the same row entry as the i'th bit of bitmap 106b. To accomplish this, the column unifier 100 is configured to determine an offset 110 between indicator bits 108 and multiply the bitmap with a multiplier selected according to the offset 110 to shift the indicator bits 108 to consecutive positions 112. The multipliers will be described in greater detail below with reference to FIG. 2.

FIG. 1 illustrates a graphical representation of consecutive positions 112 with the indicator bits 108 shifted to the beginning of the bitmap 106a or 106b. As used herein, the phrase "consecutive position" refers to indicator bits 108 positioned consecutively without intervening non-indicator bits. In other words, the indicator bits 108 are grouped together. The indicator bits 108 may be shifted to the beginning of the bitmap 106a, 106b, to the end of the bitmap 106a, 106b, or to any position within the bitmap 106a, 106b.

Figure 2:
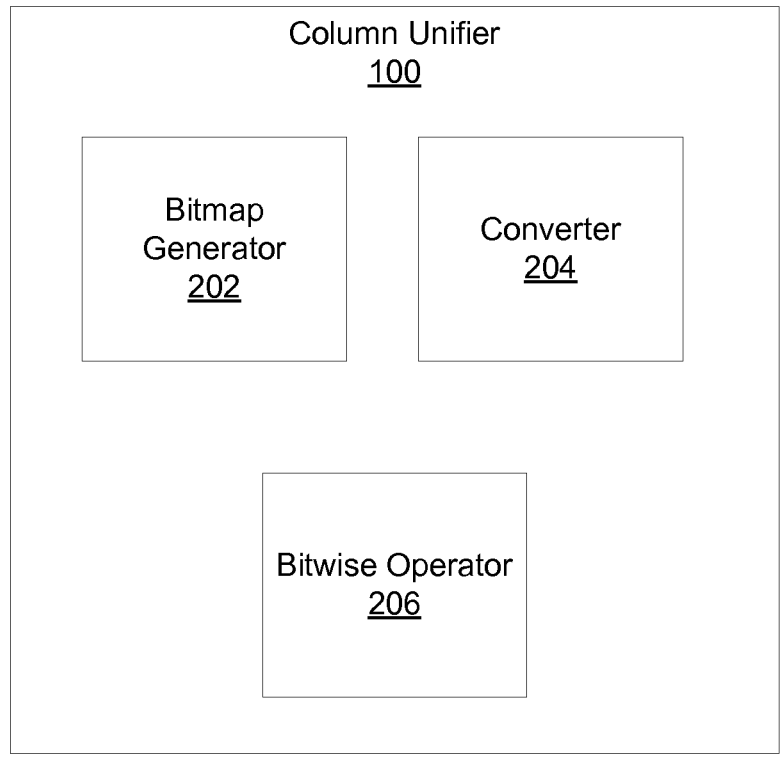
FIG. 2 is a schematic block representation of the column unifier.

FIG. 2 is a schematic block representation of the column unifier 100 described above in FIG. 1. The column unifier 100 includes a bitmap generator 202, a converter 204, and a bitwise operator 206. The column unifier 100, in one embodiment, is configured to query entries in a column store. The unifier 100, in one example, queries the entries in the column-store by evaluating columns independently of each other. The query may include a predicate or condition. The bitmap generator 202 is configured to generate a linear bitmap 106 containing the column entries and an indicator bit for each column entry. The indicator bit 108 identifies whether the column entry satisfies the query. In one example, the indicator bit is set to a value of 1 if the column entry satisfies the predicate, and a 0 otherwise. The indicator bit may be appended or prepended to the column entry. One example of a bitmap 106 is given above with reference to FIG. 1.

The converter 204 is configured to multiply the query-result bitmap 106 with a multiplier to shift the indicator bits into consecutive positions in the linear bitmap 106. The converter 204 accomplishes this by multiplying the query-result bitmap with a multiplier M. In a further embodiment, the multiplication is followed by the bitwise operator 206 performing a bitwise AND with a mask S. In yet another embodiment, the column unifier 100 may then combine the results of multiple query-result bitmaps by performing a bitwise AND because, despite different offsets (or column entry sizes), the indicator bits of each query-result bitmap are coalesced together into consecutive positions.

The multiplier M and the mask S, in one embodiment, are equations preselected according to the offset that when applied to a query result bitmap result in indicator bits being shifted into consecutive positions. Examples of the multiplier M and mask S will now be given by way of example only and are not intended to limit the disclosure to these examples. One of skill in the art will recognize that other equations may be selected that, when performed by the converter 204, shift the indicator bits into consecutive positions.

In one embodiment, where the offset k is greater than or equal to 8, the operations performed by the column unifier 100 may be represented by the following pseudo-code:

```
1.   Inputs:
2.     A: query-result bitmap
3.     k: offset
4.     j: k - 1
5.     M = 1 + 2^j + 2^{2j} + ... 2^{(floor(64/k)-1)j}
6.     S = 2^64 - 2^{floor(64/k)}
7.
8.     (A * M) & S
```

Where the offset is greater than or equal to 4 and less than 8, the operations performed by the column unifier may be represented by the following pseudo-code:

```
1. Inputs:
2.   A: query-result bitmap
3.   k: offset
4.   j: k - 1
5.   m = k^2 - k
6.   n = k^2
7.   M1 = 1 + 2^j + 2^{2j} + ... 2^{(k-1)j}
8.   S1 = 2^64 - 2^{64-k} + 2^{64-n} - 2^{64-n-k} + 2^{64-2n} - 2^{64-2n-k} + 2^{64-3n} - 2^{64-3n-k} + ... (until exponents are less than 0)
9.   M2 = 1 + 2^m + 2^{2m} + ... 2^{(ceil(64/n-1)m)}
10.  S2 = 2^64 - 2^{(floor(64/k))}
11.
12. ((( A * M1 ) & S1 ) * M2 ) & S2
```

Where the offset is equal to 3, the operations performed by the column unifier may be represented by the following pseudo-code:

```
1. Inputs:
2.   A: query-result bitmap
3.   k: offset
4.   j: k - 1
5.   m = k^2 - k
6.   n = k^2
7.   M1 = 1 + 2^j + 2^{2j} + ... 2^{(k-1)j}
8.   S1 = 2^64 - 2^{64-k} + 2^{64-n} - 2^{64-n-k} + 2^{64-2n} - 2^{64-2n-k} + 2^{64-3n} - 2^{64-3n-k} + ... (until exponents are less than 0)
9.   M2 = 1 + 2^m + 2^{2m} + ... 2^{(ceil(64/n-1)m)}
10.  S2 = 2^64 - 2^{(floor(64/k))}
11.  M3 = 1 + 2^18 + 2^36
12.  S3 = 2^64 - 2^{64-9} + 2^{64-27} - 2^{64-36} + 2^{64-54} - 2^{64-63}
13.
14. ((((( A * M1 ) & S1 ) * M2 ) & S2) & S3 ) * M3
```

Where the offset is equal to 2, the operations performed by the column unifier may be represented by the following pseudo-code:

```
13. Inputs:
14.   A: query-result bitmap
15.   k: offset
16.   j: k - 1
17.   m = k^2 - k
18.   n = k^2
19.   M1 = 1 + 2^j + 2^{2j} + ... 2^{(k-1)j}
20.   S1 = 2^64 - 2^{64-k} + 2^{64-n} - 2^{64-n-k} + 2^{64-2n} - 2^{64-2n-k} + 2^{64-3n} - 2^{64-3n-k} + ... (until exponents are less than 0)
21.   M2 = 1 + 2^m + 2^{2m} + ... 2^{(ceil(64/n-1)m)}
22.   S2 = 2^64 - 2^{(floor(64/k))}
23.   M3 = 17
24.   S3 = 0xF0F0F0F0F0F0F0F0
25.   M4 = 257
26.   S4 = 0xFF00FF00FF00FF00
27.   M5 = 65537
28.   S5 = 0xFFFF0000FFFF0000
29.
30. ((((((((( A*M1 ) & S1 ) *M2 ) & S2) & S3 ) *M3 ) & S4 ) *M4 ) & S5 ) *M5
```

Where the offset is equal to 1 no multiplications are necessary.

Figure 3:
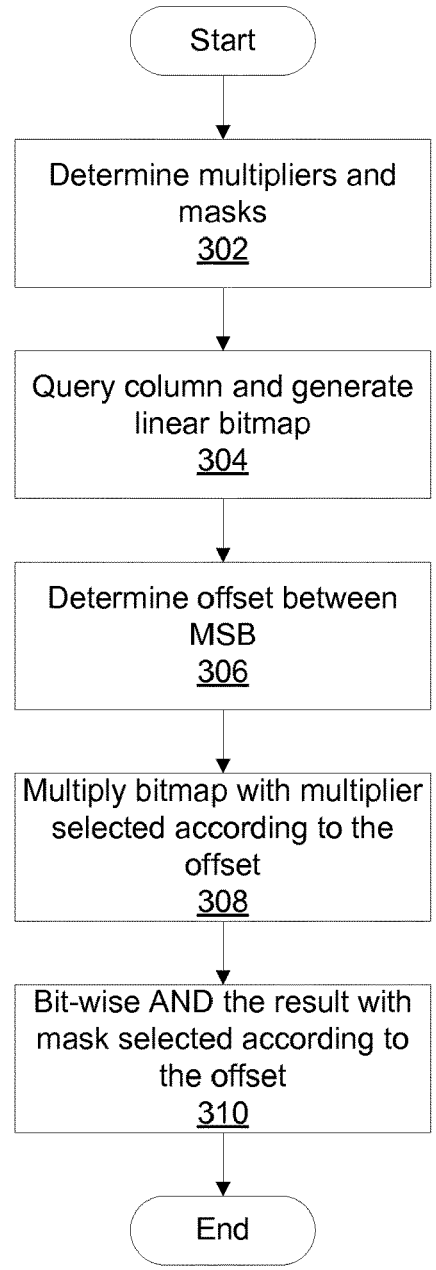
FIG. 3 is a schematic flow chart diagram illustrating one embodiment of a method for column-stitching in column stores.

FIG. 3 is a schematic flow chart diagram illustrating one embodiment of a method for column-stitching in column stores. The method begins and, in one example, the column unifier 100 determines 302 multipliers M and masks S. Determining 302 or identifying multipliers M and masks S, in one embodiment, includes identifying or pre-selecting equations that when performed by the converter 204 shift indicator bits into consecutive positions as described above.

The column unifier 100 then queries 304 a column and generates a linear bitmap having an indicator bit for each column entry. The bitmap, as described above with reference to FIG. 1, is a column-major bitmap 106a, 106b with indicator bits 108 separated by an offset 110. The offset may correspond to the length of the column entry. The column unifier 100 then determines 306 an offset between the indicator bits (most significant bits).

The converter 204 then multiplies 308 the bitmap with one of the multipliers M according to the identified offset. In one embodiment, the converter 204 multiplies the bitmap with a single multiplier M. In alternative embodiments, the converter 204 multiplies the bitmap with a series of multipliers M, and a bitwise AND with a mask S after each multiplication.

The bitwise operator 206 then performs 310 a bitwise AND with the multiplied query-result bitmap. As described above with reference to FIG. 3, the application of multipliers M and masks S depends on the offset, and different combinations of multipliers M and masks S may be selected according to the offset. For example, when the offset is greater than or equal to 8, the multiplier is the equation $M=1+2^j+2^{2j}+ \ldots 2^{(floor(64/k)-1)j}$ where $j=k-1$ and the mask is the equation $S=2^{64}-2^{floor(64/k)}$. The result of the multiplication of the query-result bitmap A followed by a bitwise AND with the mask S will result in a bitmap having indicator bits shifted to consecutive positions.

When the offset is greater than or equal to 4 and less than 8, the column unifier 100 shifts the indicator bits into consecutive positions by: multiplying the linear bitmap with the multiplier $M1=1+2^j+2^{2j}+ \ldots 2^{(k-1)j}$; performing the bitwise AND of the linear bitmap with the mask $S1=2^{64}-2^{64-k}+2^{64-n}-2^{64-n-k}+2^{64-2n}-2^{64-2n-k}+2^{64-3n}-2^{64-3n-k}+ \ldots$ (until exponents are less than 0); multiplying the linear bitmap with a second multiplier $M2=1+2^m+2^{2m}+ \ldots 2^{(ceil(64/n-1)m}$ and performing a bitwise AND of the linear bitmap with a second mask $S2=2^{64}-2^{(floor(64/k))}$.

If the offset is equal to 3, the column unifier 100 shifts the indicator bits into consecutive positions by first performing the steps when the offset is greater than or equal to 4 and less than 8, then performing: performing a bitwise AND of the linear bitmap with a third mask $S3=2^{64}-2^{64-9}+2^{64-27}-2^{64-36}+2^{64-54}-2^{64-63}$; and multiplying the linear bitmap with a third multiplier $M3=1+2^{18}2^{36}$.

If the offset is equal to 2, the column unifier 100 shifts the indicator bits into consecutive positions by first performing the steps when the offset is greater than or equal to 4 and less than 8, then performing: the operation (((((linear bitmap & S3)*M3) & S4)*M4) & S5)*M5); where S3=0xF0F0F0F0F0F0F0F0, M3=17, S4=0xFF00FF00FF00FF00, M4=257, S5=0xFFFF0000FFFF0000u11, M5=65537, $j=k-1$, $m=k^{2-k}$, and $n=k^2$.

The above multiplications and AND operations will result in a bitmap for each column of the column store. Each bitmap will include indicator bits shifted into consecutive positions, and as such, the various bitmaps may be "stitched" together easily regardless of the length of the bitmaps because the indicator bits are aligned to consecutive positions at the beginnings, for example, of each bitmap. The multipliers M and masks S may be applied as shown, or alternatively in any order that causes the indicator bits to coalesce or shift into consecutive positions within the bitmap as a result of a multiplication.

Figure 4:
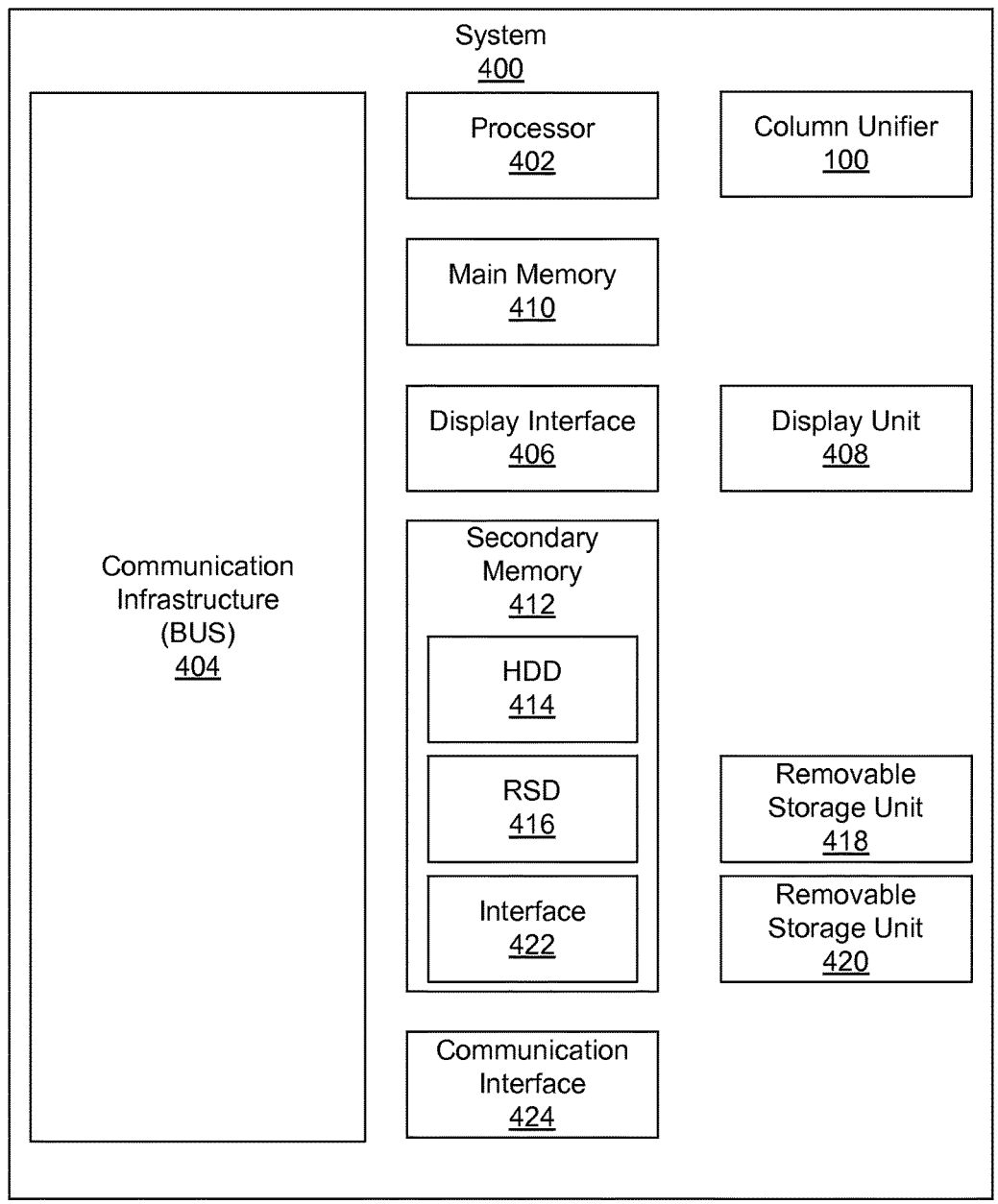
FIG. 4 is a high level block diagram showing an information processing system 400.

FIG. 4 is a high level block diagram showing an information processing system 400. The system 400 includes one or more processors, such as processor 402. The processor 402 is connected to a communication infrastructure 404 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 406 that forwards graphics, text, and other data from the communication infrastructure 404 (or from a frame buffer not shown) for display on a display unit 408. The computer system also includes a main memory 410, preferably random access memory (RAM), and may also include a secondary memory 412. The secondary memory 412 may include, for example, a hard disk drive 414 and/or a removable storage drive 416, representing, for example, a floppy disk drive, a magnetic tape drive, or an optical disk drive. The removable storage drive 416 reads from and/or writes to a removable storage unit 418 in a manner well known to those having ordinary skill in the art. Removable storage unit 418 represents, for example, a floppy disk, a compact disc, a magnetic tape, or an optical disk, etc. which is read by and written to by removable storage drive 416. As will be appreciated, the removable storage unit 418 includes a computer readable medium having stored therein computer software and/or data.

In alternative embodiments, the secondary memory 412 may include other similar means for allowing computer programs or other instructions to be loaded into the computer system. Such means may include, for example, a removable storage unit 420 and an interface 422. Examples of such means may include a program cartridge and cartridge interface (such as that found in video game devices), a removable memory chip (such as an EPROM, or PROM) and associated socket, and other removable storage units 420 and interfaces 422 which allow software and data to be transferred from the removable storage unit 420 to the computer system.

The computer system may also include a communications interface 424. Communications interface 424 allows software and data to be transferred between the computer system and external devices. Examples of communications interface 424 may include a modem, a network interface (such as an Ethernet card), a communications port, or a PCMCIA slot and card, etc. Software and data transferred via communications interface 424 are in the form of signals which may be, for example, electronic, electromagnetic, optical, or other signals capable of being received by communications interface 424. These signals are provided to communications interface 424 via a communications path (i.e., channel). This communications path carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 410 and secondary memory 412, removable storage drive 416, and a hard disk installed in hard disk drive 414.

Computer programs (also called computer control logic) are stored in main memory 410 and/or secondary memory 412. Computer programs may also be received via communications interface 424. Such computer programs, when executed, enable the computer system to perform the features of the present invention as discussed herein. In particular, the computer programs, when executed, enable the processor 402 to perform the features of the column unifier 100. Accordingly, such computer programs represent controllers of the computer system.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

An embodiment of a system includes at least one column unifier 100 coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to join query-result bitmaps in a column-major column store.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer program product comprising:
   a non-transitory computer readable storage medium to store a computer readable program, wherein the computer readable program, when executed by a processor within a computer, causes the computer to perform operations for evaluating columns in a column store, the operations comprising:
   querying, with a predicate, a plurality of column values of a multi-dimensional array of data configured linearly in a column-major layout and stored in memory of a computing device;
   generating an indicator bit for each of the plurality of column values, each indicator bit including a value indicating whether the predicate is satisfied based on a result of querying each respective column value of the plurality of column values;
   generating a column-major linear bitmap from the result of querying each of the plurality of column values, each column value of the column-major linear bitmap including a respective indicator bit;
   determining an offset between adjacent indicator bits in the column-major linear bitmap;
   multiplying the column-major linear bitmap with a multiplier based on the offset to shift the indicator bits into consecutive positions in the linear bitmap;
   combining the plurality of column values from the multiplied linear bitmap and a second plurality of column values from a second multiplied linear bitmap to generate a set of stitched column values; and
   storing the set of stitched column values on a computer readable storage medium,
   wherein combining the plurality of column values and the second plurality of column values comprises performing a bitwise AND of the multiplied linear bitmap and the second multiplied linear bitmap.

2. The computer program product of claim 1, further comprising:
   selecting the multiplier according to the offset to shift the indicator bits into the consecutive positions at one of a prepended position and an appended position;
   wherein combining the plurality of column values and the second plurality of column values further comprises performing the bitwise AND of the multiplied linear bitmap and the second multiplied linear bitmap with a mask S.

3. The computer program product of claim 2, wherein the multiplier is the equation $M=1+2^j+2^{2j}+\ldots 2^{(floor(64/k)-1)j}$, the mask is the equation $S=2^{64}-2^{floor(64/k)}$, and $j=k-1$ for a value of the offset k that is greater than or equal to 8.

4. The computer program product of claim 2, for a value of the offset k that is greater than or equal to 4 and less than 8, further comprising:
- multiplying the linear bitmap with the multiplier $M1=1+2^j+2^{2j}+\ldots 2^{(k-1)j}$;
- performing the bitwise AND of the linear bitmap with the mask $S1=2^{64}-2^{64-k}+2^{64-n}-2^{64-n-k}+2^{64-2n}-2^{64-2n-k}+2^{64-3n}-2^{64-3n-k}+\ldots$ (until exponents are less than 0);
- multiplying the linear bitmap with a second multiplier $M2=1+2^m+2^{2m}+\ldots 2^{(ceil(64/n-1)m)}$;
- performing a bitwise AND of the linear bitmap with a second mask $S2=2^{64}-2^{(floor(64/k))}$; and
- where $j=k-1$, $m=k^2-k$, and $n=k^2$.

5. The computer program product of claim 2, for a value of the offset k that is equal to 3, further comprising:
- multiplying the linear bitmap with the multiplier $M1=1+2^j+2^{2j}+\ldots 2^{(k-1)j}$;
- performing the bitwise AND of the linear bitmap with the mask $S1=2^{64}-2^{64-k}+2^{64-n}-2^{64-n-k}+2^{64-2n}-2^{64-2n-k}+2^{64-3n}-2^{64-3n-k}+\ldots$ (until exponents are less than 0);
- multiplying the linear bitmap with a second multiplier $M2=1+2^m+2^{2m}+\ldots 2^{(ceil(64/n-1)m)}$;
- performing a bitwise AND of the linear bitmap with a second mask $S2=2^{64}-2^{(floor(64/k))}$;
- performing a bitwise AND of the linear bitmap with a third mask $S3=2^{64}-2^{64-9}+2^{64-27}-2^{64-36}+2^{64-54}-2^{64-63}$;
- multiplying the linear bitmap with a third multiplier $M3=1+2^{18}+2^{36}$; and
- where $j=k-1$, $m=k^2-k$, and $n=k^2$.

6. The computer program product of claim 2, for a value of the offset k that is equal to 2, further comprising:
- multiplying the linear bitmap with the multiplier $M1=1+2^j+2^{2j}+\ldots 2^{(k-1)j}$;
- performing the bitwise AND of the linear bitmap with the mask $S1=2^{64}-2^{64-k}+2^{64-n}-2^{64-n-k}+2^{64-2n}-2^{64-2n-k}+2^{64-3n}-2^{64-3n-k}+\ldots$ (until exponents are less than 0);
- multiplying the linear bitmap with a second multiplier $M2=1+2^m+2^{2m}+\ldots 2^{(ceil(64/n-1)m)}$;
- performing a bitwise AND of the linear bitmap with a second mask $S2=2^{64}-2^{(floor(64/k))}$;
- performing the operation (((((linear bitmap & S3)*M3) & S4)*M4) & S5)*M5); and
- where S3=0xF0F0F0F0F0F0F0F0, M3=17, S4=0xFF00FF00FF00FF00, M4=257, S5=0xFFFF0000FFFF0000u11, M5=65537, $j=k-1$, $m=k^2-k$, and $n=k^2$.

7. A method comprising:
- querying, with a predicate, a plurality of column values of a multi-dimensional array of data configured linearly in a column-major layout and stored in memory of a computing device;
- generating an indicator bit for each of the plurality of column values, each indicator bit including a value indicating whether the predicate is satisfied based on a result of querying each respective column value of the plurality of column values;
- generating a column-major linear bitmap from the result of querying each of the plurality of column values, each column value of the column-major linear bitmap including a respective indicator bit;
- determining an offset between adjacent indicator bits in the column-major linear bitmap;
- multiplying, via a processor, the column-major linear bitmap with a multiplier based on the offset to shift the indicator bits into consecutive positions in the linear bitmap;
- combining the plurality of column values from the multiplied linear bitmap and a second plurality of column values from a second multiplied linear bitmap to generate a set of stitched column values; and
- storing the set of stitched column values on a computer readable storage medium,
- wherein combining the plurality of column values and the second plurality of column values comprises performing a bitwise AND of the multiplied linear bitmap and the second multiplied linear bitmap.

8. The method of claim 7, further comprising:
- selecting the multiplier according to the offset to shift the indicator bits into the consecutive positions at one of a prepended position and an appended position;
- wherein combining the plurality of column values and the second plurality of column values further comprises performing the bitwise AND of the multiplied linear bitmap and the second multiplied linear bitmap with a mask S.

9. The method of claim 8, wherein the multiplier is the equation $M=1+2^j+2^{2j}+\ldots 2^{(floor(64/k)-1)j}$, the mask is the equation $S=2^{64}-2^{floor(64/k)}$, and $j=k-1$ for a value of the offset k that is greater than or equal to 8.

10. The method of claim 8, for a value of the offset k that is greater than or equal to 4 and less than 8, further comprising:
- multiplying the linear bitmap with the multiplier $M1=1+2^j+2^{2j}+\ldots 2^{(k-1)j}$;
- performing the bitwise AND of the linear bitmap with the mask $S1=2^{64}-2^{64-k}+2^{64-n}-2^{64-n-k}+2^{64-2n}-2^{64-2n-k}+2^{64-3n}-2^{64-3n-k}+\ldots$ (until exponents are less than 0);
- multiplying the linear bitmap with a second multiplier $M2=1+2^m+2^{2m}+\ldots 2^{(ceil(64/n-1)m)}$;
- performing a bitwise AND of the linear bitmap with a second mask $S2=2^{64}-2^{(floor(64/k))}$; and
- where $j=k-1$, $m=k^2-k$, and $n=k^2$.

11. The method of claim 8, for a value of the offset k that is equal to 3, further comprising:
- multiplying the linear bitmap with the multiplier $M1=1+2^j+2^{2j}+\ldots 2^{(k-1)j}$;
- performing the bitwise AND of the linear bitmap with the mask $S1=2^{64}-2^{64-k}+2^{64-n}-2^{64-n-k}+2^{64-2n}-2^{64-2n-k}+2^{64-3n}-2^{64-3n-k}+\ldots$ (until exponents are less than 0);
- multiplying the linear bitmap with a second multiplier $M2=1+2^m+2^{2m}+\ldots 2^{(ceil(64/n-1)m)}$;
- performing a bitwise AND of the linear bitmap with a second mask $S2=2^{64}-2^{(floor(64/k))}$;
- performing a bitwise AND of the linear bitmap with a third mask $S3=2^{64}-2^{64-9}+2^{64-27}-2^{64-36}+2^{64-54}-2^{64-63}$;
- multiplying the linear bitmap with a third multiplier $M3=1+2^{18}+2^{36}$; and
- where $j=k-1$, $m=k^2-k$, and $n=k^2$.

12. The method of claim 8, for a value of the offset k that is equal to 2, further comprising:
- multiplying the linear bitmap with the multiplier $M1=1+2^j+2^{2j}+\ldots 2^{(k-1)j}$;
- performing the bitwise AND of the linear bitmap with the mask $S1=2^{64}-2^{64-k}+2^{64-n}-2^{64-n-k}+2^{64-2n}-2^{64-2n-k}+2^{64-3n}-2^{64-3n-k}+\ldots$ (until exponents are less than 0);

multiplying the linear bitmap with a second multiplier $M2=1+2^m+2^{2m}+\ldots 2^{(ceil(64/n-1)m)}$;

performing a bitwise AND of the linear bitmap with a second mask $S2=2^{64}-2^{(floor(64/k))}$;

performing the operation (((((linear bitmap & S3)*M3) & S4)*M4) & S5)*M5); and where  S3=0xF0F0F0F0F0F0F0F0,  M3=17, S4=0xFF00FF00FF00FF00, M4=257, S5=0xFFFF0000FFFF0000u11, M5=65537, j=k−1, m=k²−k, and n=k².

13. A system comprising:
a processor;
a column unifier configured to query, with a predicate, a plurality of column of a multi-dimensional array of data configured linearly in a column-major layout and stored in memory of a computing device, and generate an indicator bit for each of the plurality of column values, each indicator bit including a value indicating whether the predicate is satisfied based on a result of querying each respective column value of the plurality of column values;
a bitmap generator configured to generate a column-major linear bitmap from the result of querying each of the plurality of column values, each column value of the column-major linear bitmap including a respective indicator bit;
wherein the column unifier is further configured to determine an offset between adjacent indicator bits in the column-major linear bitmap;
a converter configured to multiply the column-major linear bitmap with a multiplier based on the offset to shift the indicator bits into consecutive positions in the linear bitmap; and
a bitwise operator configured to combine the plurality of column values from the multiplied linear bitmap and a second plurality of column values from a second multiplied linear bitmap to generate a set of stitched column values,
wherein:
  the column unifier is further configured to store the set of stitched column values on a computer readable storage medium, and
  the bitwise operator is configured to perform a bitwise AND of the multiplied linear bitmap and the second multiplied linear bitmap when combining the plurality of column values and the second plurality of column values.

14. The system of claim 13, wherein:
the converter is further configured to select the multiplier according to the offset to shift the indicator bits into the consecutive positions at one of a prepended position and an appended position; and
the bitwise operator is configured to perform the bitwise AND of the multiplied linear bitmap and the second multiplied linear bitmap with a mask S.

15. The system of claim 14, wherein the multiplier is the equation $M=1+2^j+2^{2j}+\ldots 2^{(floor(64/k)-1)j}$, the mask is the equation $S=2^{64}-2^{floor(64/k)}$, and j=k−1 for a value of the offset k that is greater than or equal to 8.

16. The system of claim 14, wherein for a value of the offset k that is greater than or equal to 4 and less than 8, the converter and bitwise operator are configured to:
multiply the linear bitmap with the multiplier $M1=1+2^j+2^{2j}+\ldots 2^{(k-1)j}$;
perform the bitwise AND of the linear bitmap with the mask $S1=2^{64}-2^{64-k}+2^{64-n}-2^{64-n-k}+2^{64-2n}-2^{64-2n-k}+2^{64-3n}-2^{64-3n-k}+$ (until exponents are less than 0);
multiply the linear bitmap with a second multiplier $M2=1+2^m+2^{2m}+\ldots 2^{(ceil(64/n-1)m)}$;
perform a bitwise AND of the linear bitmap with a second mask $S2=2^{64}-2^{(floor(64/k))}$; and
where j=k−1, m=k²−k, and n=k².

17. The system of claim 14, wherein for a value of the offset k that is equal to 3, the converter and bitwise operator are configured to:
multiply the linear bitmap with the multiplier $M1=1+2^j+2^{2j}+\ldots 2^{(k-1)j}$;
perform the bitwise AND of the linear bitmap with the mask $S1=2^{64}-2^{64-k}+2^{64-n}-2^{64-n-k}+2^{64-2n}-2^{64-2n-k}+2^{64-3n}-2^{64-3n-k}+\ldots$ (until exponents are less than 0);
multiply the linear bitmap with a second multiplier $M2=1+2^m+2^{2m}+\ldots 2^{(ceil(64/n-1)m)}$;
perform a bitwise AND of the linear bitmap with a second mask $S2=2^{64}-2^{64}-2^{(floor(64/k))}$;
perform a bitwise AND of the linear bitmap with a third mask $S3=2^{64}-2^{64-9}+2^{64-27}-2^{64-36}+2^{64-54}-2^{64-63}$;
multiply the linear bitmap with a third multiplier $M3=1+2^{18}+2^{36}$; and
where j=k−1, m=k²−k, and n=k².

18. The system of claim 14, wherein for a value of the offset k that is equal to 2, the converter and bitwise operator are configured to:
multiply the linear bitmap with the multiplier $M1=1+2^j+2^{2j}+\ldots 2^{(k-1)j}$;
perform the bitwise AND of the linear bitmap with the mask $S1=2^{64}-2^{64-k}+2^{64-n}-2^{64-n-k}+2^{64-2n}-2^{64-2n-k}+2^{64-3n}-2^{64-3n-k}+\ldots$ (until exponents are less than 0);
multiply the linear bitmap with a second multiplier $M2=1+2^m+2^{2m}+\ldots 2^{(ceil(64/n-1)m)}$;
perform a bitwise AND of the linear bitmap with a second mask $S2=2^{64}-2^{(floor(64/k))}$;
perform the operation (((((linear bitmap & S3)*M3) & S4)*M4) & S5)*M5); and
where  S3=0xF0F0F0F0F0F0F0F0,  M3=17, S4=0xFF00FF00FF00FF00, M4=257, S5=0xFFFF0000FFFF0000u11, M5=65537, j=k−1, m=k²−k, and n=k².

* * * * *